United States Patent [19]

Stemme et al.

[11] 4,272,602
[45] Jun. 9, 1981

[54] RECORDING MEDIUM AND METHOD OF MAKING

[75] Inventors: Otto Stemme, Munich; Frank A. Staudacher, Haan, both of Fed. Rep. of Germany

[73] Assignee: AGFA-Gevaert, A.G., Leverkusen, Fed. Rep. of Germany

[21] Appl. No.: 73,788

[22] Filed: Sep. 10, 1979

[30] Foreign Application Priority Data

Sep. 12, 1978 [DE] Fed. Rep. of Germany ....... 2839658

[51] Int. Cl.³ .............................................. B05D 3/14
[52] U.S. Cl. ..................................... 430/140; 427/48; 427/128; 427/130; 428/900

[58] Field of Search ...................... 427/128, 130, 48; 428/900; 430/140

[56] References Cited

U.S. PATENT DOCUMENTS 4,008,088  2/1977  Van Paesschen ................... 430/130

Primary Examiner—Bernard D. Pianalto
Attorney, Agent, or Firm—Connolly & Hutz

[57] ABSTRACT

Recording medium for photographic prints comprising a magnetizable layer on the rear side of a photographic material which is preferrably paper based, the magnetizable areas having different surface roughnesses. This medium allows recording of sound information or codes on the prints and reproduction in recorders or by monitoring.

9 Claims, 11 Drawing Figures

RECORDING MEDIUM AND METHOD OF MAKING

The invention relates to a recording medium for photographic prints with a light-sensitive and a magnetizable recording surface and to processes for its production.

The most varied types of recording media are known, including those which are both light-sensitive and magnetizable. The most widely known is at present the Super 8-sound film which, owing to the magnetizable layer applied to its edge, allows the moving pictures to be provided with sound. There is also no lack of suggested methods to enable still pictures to be individually provided with sound. Thus it is for example, known to provide slide-frames or picture sleeves with a magnetizable recording layer and using this to phonetically comment on the individual pictures. In spite of the considerable number of methods suggested up until now no noteworthy successes have however been observed. This is due to the fact that the subjects of all the suggestions have up until now been too complicated or too costly to be successful.

It is the aim of the invention to create a recording medium of the nature mentioned at the outset, which is able to be produced inexpensively in large quantities and which provides the possibility of use in wide consumer classes.

According to the invention the set aim is solved by a recording medium for photographic prints with a light-sensitive and a magnetizable recording surface whereby the magnetizable recording surface consists of a layer which contains a magnetic pigment and whereby the magnetizable layer is arranged on the rear side of the support which carries the light-sensitive layer, the support preferably being paper. Appropriate and advantageous embodiments of same as well as processes for its production are described in the specification and are explained in more detail in the following, with the aid of the illustrations.

DESCRIPTION OF THE PREFERRED EMBODIMENTS

Figure 1:
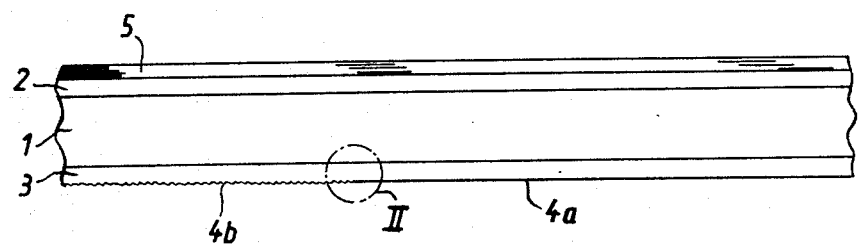
FIG. 1 shows a cross-section through a recording medium according to the invention.

FIG. 1 shows a cross-section of the recording medium according to the invention. It consists of a relatively thick and stiff support 1, for example paper, and two polymer layers covering the latter on both sides, for example polyethylene layers 2 and 3, which prevent the penetration, during the wet processing, of water and chemicals into the support 1. The light-sensitive layer 5 is applied to the upper polyethylene layer 2, this layer 5 consisting, in the case of black and white material, mainly of one layer and, in the case of colour material, of several layers. In order to let appear the support as white as possible the layer 2 is optionally pigmented with titanium dioxide.

To this extent the material is known and widely used as photographic paper. The improvement of the recording medium which is essential to the invention is that the polyethylene layer 3 on the reverse side is filled with magnetizable particles, for example iron oxide and thus provides the posibility of magnetic recording of signals, for example sound-recordings.

The reverse side 3 of customary photographic papers has to be roughened to a certain degree, so that they can be stamped, written on, or stuck on to a background using commercially available adhesives. The surface roughness necessary for this has to amount to at least $2\mu$. Such a roughness would be too great for magnetic heads for impressing signals, and it would wear these away relatively quickly, therefore, the surface roughness of magnetic tapes is for example in the region of $1\mu$ and below. The layer 3 thus has to be both rough and smooth in order to fulfill its required tasks.

According to a first embodiment of the invention the problem is solved in that a compromise is sought between the required surface roughnesses. For this it is necessary to use recording and playback equipment with high-quality sound heads which are abrasion resistant.

On the other hand it is however desirable in the case of equipment in the more widespread price classes, to use less expensive magnetic heads. In this case the problem is solved according to the invention in that the layer 3 is provided with a surface 4 which has rough stripes 4b by alternating with smooth stripes 4a, as can be seen from FIG. 2, which shows an enlarged section taken from FIG. 1.

Figure 3:
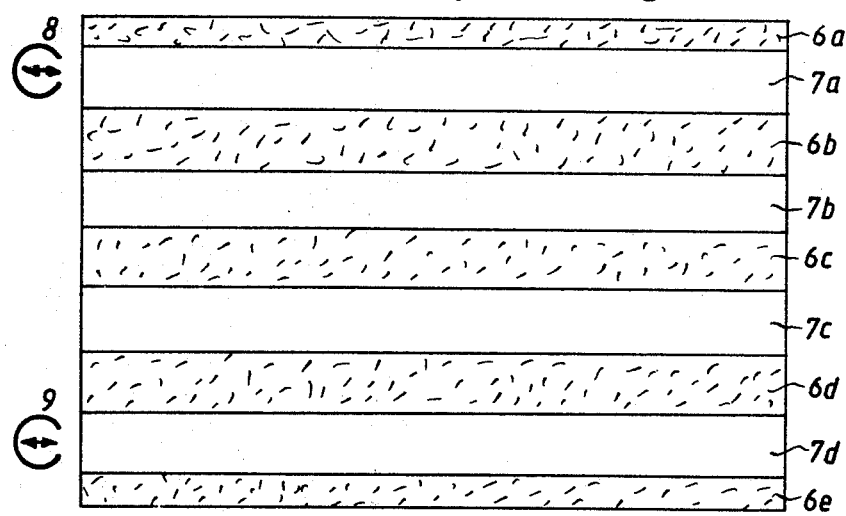
FIG. 3 shows a view of the reverse side of a recording medium with recording stripes running parallel to the edge of the photographic print.
Figure 4:
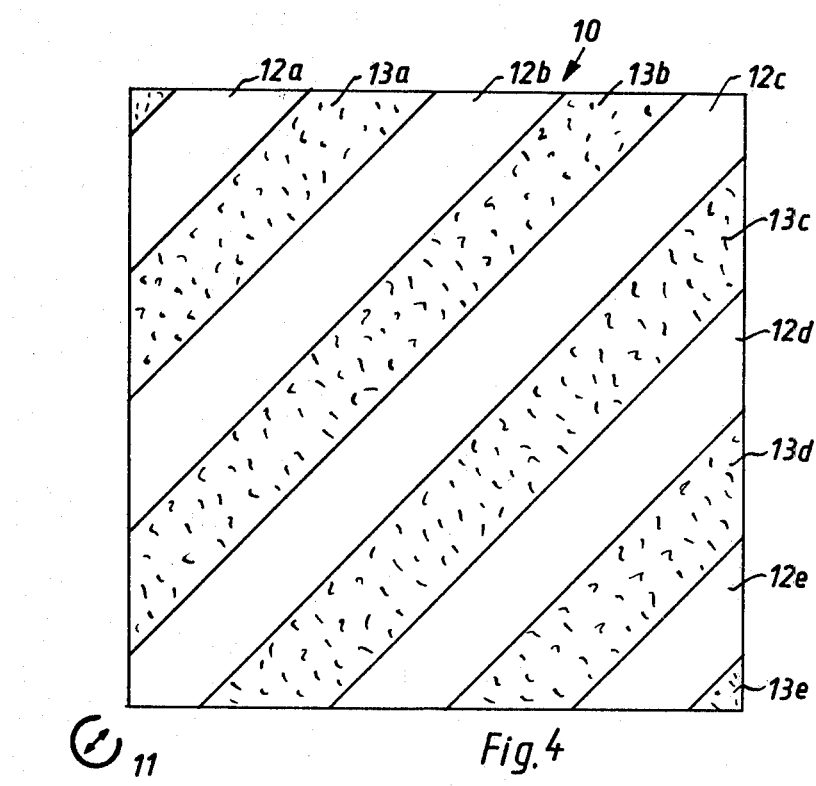
FIG. 4 shows a view of the reverse side of a recording medium with diagonal recording stripes.

Two top views of the reverse side of two embodiments of the recording support according to the invention are illustrated in FIGS. 3 and 4. In the embodiment according to FIG. 3 the stripes 6 or 7 run parallel to the longer edge of the photographic print. The rough stripes are numbered 6a to 6e, the smooth stripes 7a to 7d. The reverse side of the print 5 can therefore be provided with magnetic recordings, via sound heads 8 and 9, on the smooth stripes, for example 7a and 7d, whereas the rough stripes 6a to 6e serve for the inclusion of writing or optionally as a surface for the adhesive, in as far as the recording media are to be fixed samewhere. FIG. 4 shows another arrangement of the stripes they are arranged diagonally. Using the centre stripe 12c, which is longer a greater recording capacity is obtained.

The stripes can be used for a variety of recordings. Thus for example a sound information can be recorded or played back on track 7a using sound head 8 and a code can be recorded on or read from stripe 7d using head 9, this code for example giving the recording date details for sorting the pictures, such as classification or numbering or even details for recording, these data being able to be optically reproduced on the display of the viewing device or employed for controlling the further use of devices.

It is also possible to use the tracks towards the centre or two tracks directly next to each other, i.e. not the outer tracks 7a and 7d. In the case of the embodiment according to FIG. 4, the shorter tracks may advantageously be used for coding purposes.

Figure 5:
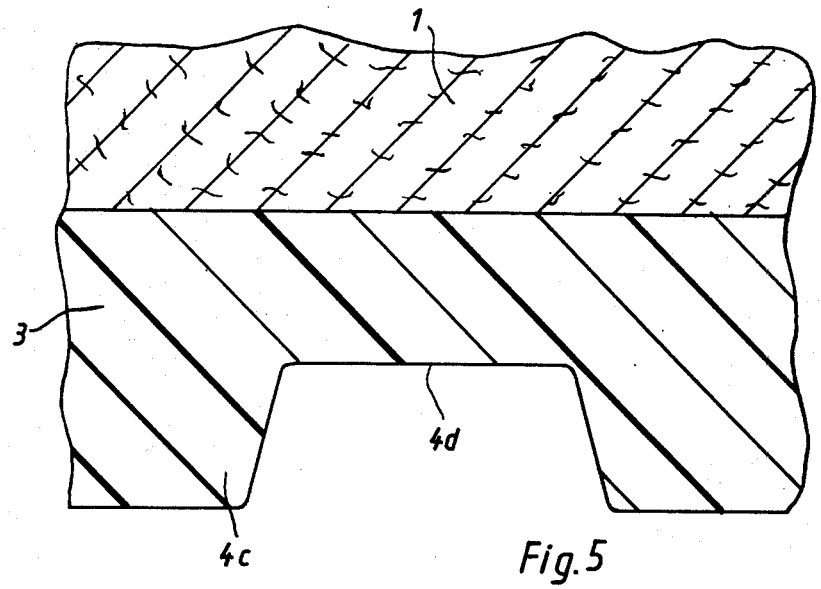
FIG. 5 shows a cross-section of the magnetizable layer with lowered areas.

Further embodiment examples of the layer structure are are seen in FIG. 5. According to this figure the support 1 is provided with a layer 3 which consists of polyethylene and which contains magnetic pigments, wherein the layer 3 has elevated stripes 4c and grooves 4d. The elevated stripe 4c can be rough and be used for stamping whereas the grooves 4d have a smooth surface and at the same time serve as guides for the magnetic head. Such a structure is in itself generally known for dictating machine foils.

Figure 6:
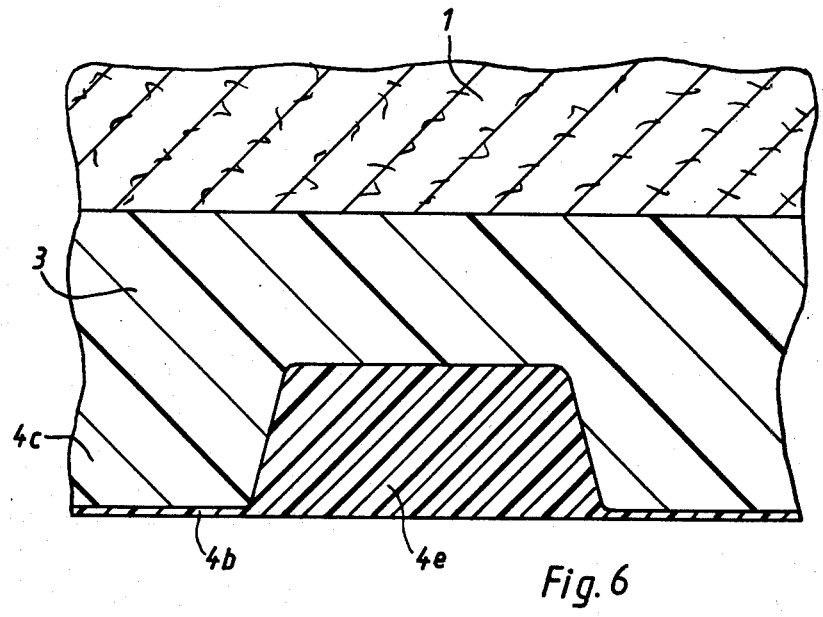
FIG. 6 shows the subject of FIG. 5 with filled grooves.

FIG. 6 shows a further development of the subject of FIG. 5. The grooves 4d are filled with a preferably white, polyethylene material filled with titanium dioxide and are therefore more easily readable after being written on. In this case the elevated stripes provided with magnetizable material are appropriately smooth.

As is known, the magnetizable iron oxide pigments are relatively dark. In order to obtain improved readability of the writing the layer in the case of the other embodiment examples is appropriately pigmented not only with iron oxide, but also, in addition, with titanium dioxide or a similar filler. Further more it is also possible to use other suitable fillers which produce colouring of the magnetizable layer in the manner desired in each case.

Figure 7:
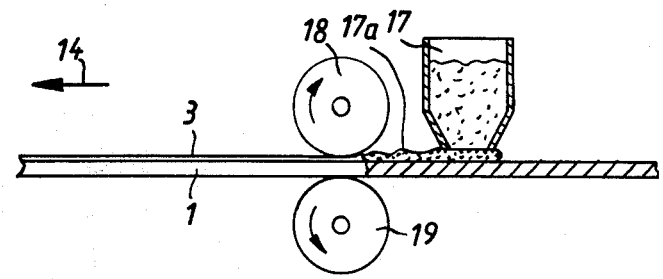
FIG. 7 shows schematically an apparatus for coating the support.

FIG. 7 shows schematically a device for producing the polyethylene layer 3 on the support 1. Since such devices are in themselves generally known and widespread, it is not necessary to mention further details.

The polyethylene granules pigmented with iron oxide are inside a container 17 and are appropriately heated therein. On the lower side of the container 17 there is a coating device which applies the liquid layer to the support 1. During this procedure a magnetic field can be employed as is known from the production of magnetic tape, in order to align needle-shaped iron oxide particles parallel in the desired direction. By means of two rollers 18 and 19 the support with the coated layer is transported in the direction of the arrow 14 and with roller 18 the desired surface pattern is simultaneously impressed. The roller 18 is described further below with the aid of FIG. 9. Since the support 1 also has to be sealed on the other side with a polyethylene layer, the support coated on the one side is coated again or even provided with the appropriate layer and surface structure on both sides simultaneously, using appropriate equipment. The sequence of the coating of the two layers can also be reversed.

Figure 8:
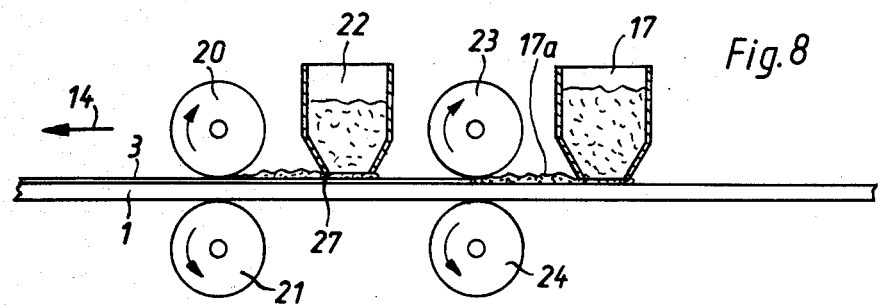
FIG. 8 shows schematically an apparatus for two-step coating.

FIG. 8 shows an arrangement which serves for two-step coating, i.e. above all for the filling of the grooves according to FIG. 6. The support 1 is first provided with the first layer 17a from container 17. This is distributed by rollers 23 and 24 and at the same time the groove structure is produced by roller 23. Then the support passes under container 22 containing the white-pigmented material. The grooves are filled during this procedure and the surface is rolled smooth again by rollers 20 and 21, so that a structure according to FIG. 6 is produced.

Figure 2:
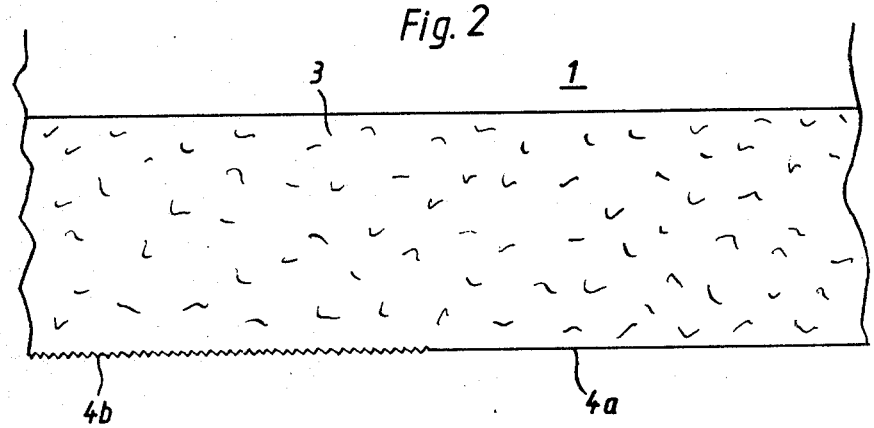
FIG. 2 shows an enlarged section taken from FIG. 1.
Figure 9:
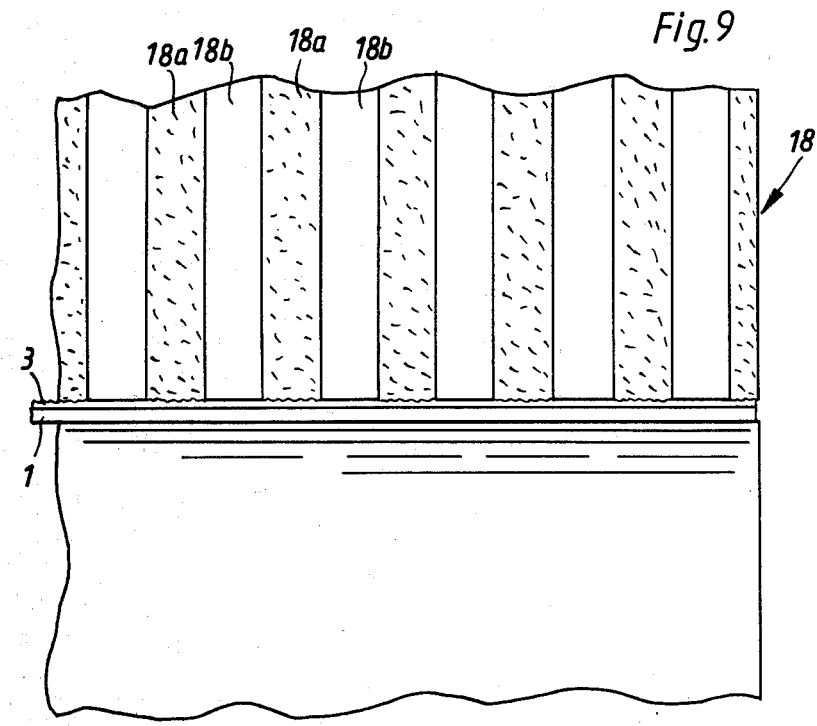
FIG. 9 shows a front view of a section of the calendering rollers.

FIG. 9 shows a view of a section of the rollers 18 or 19 and the support 1 between these with its applied layer 3. As can be seen from the figure, roller 18 has ring-shaped zones of differing surface roughness, with which the pattern according to FIGS. 1 and 2 is impressed in running direction of the support 1.

Figure 10:
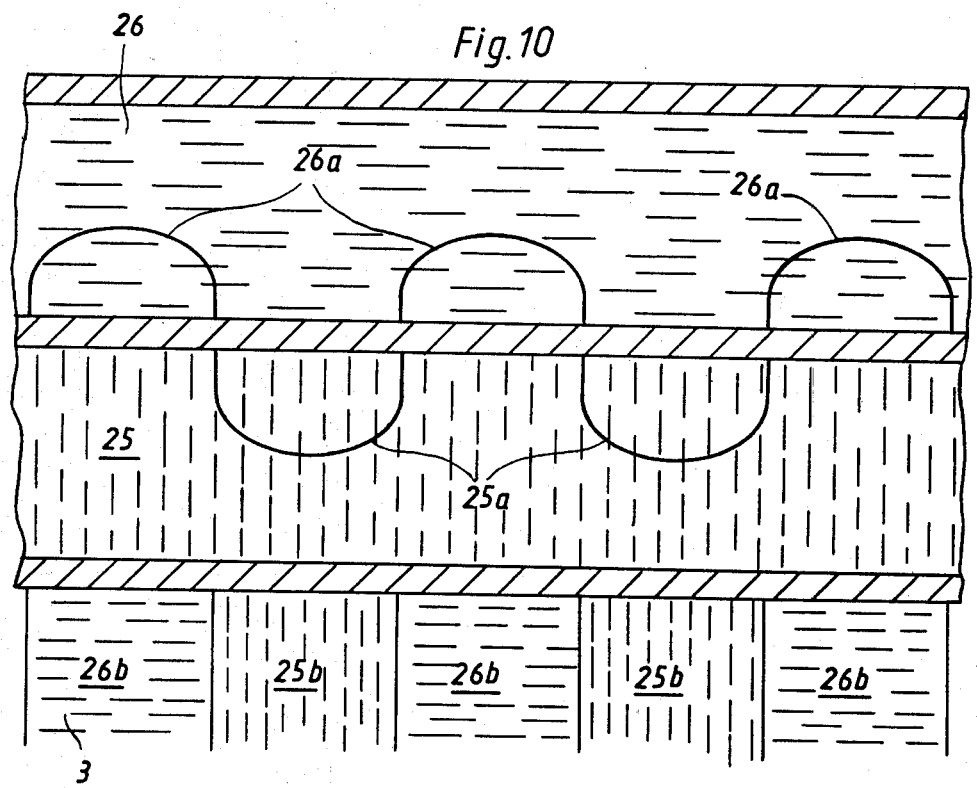
FIG. 10 shows a section of a coating arrangement for a polymer composition containing stripewise different pigments.
Figure 11:
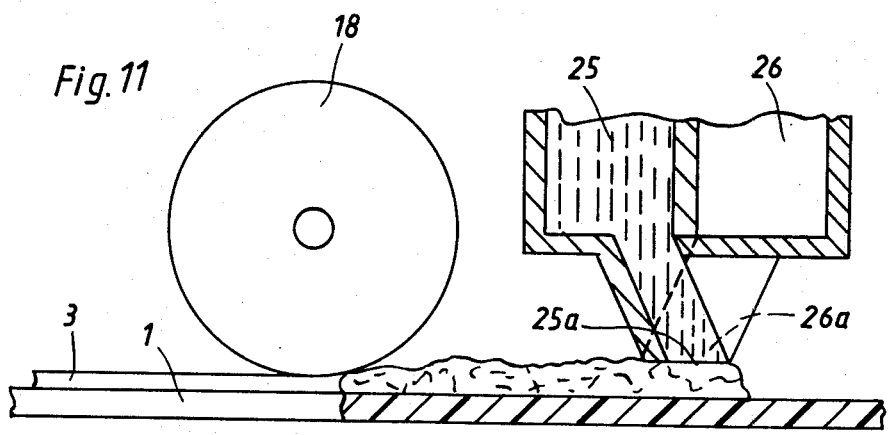
FIG. 11 shows a section of the coating arrangement of FIG. 10.

A further method possible for the stripe-wise coating of magnetizable and non-magnetizable stripes consists, according to FIGS. 10 and 11, of coating the polymer composition in stripes via outlet opening 25a, 26a, arranged side by side, from different containers 25 and 26 containing pigmented and non-pigmented polymer composition the latter being a colour pigmented polymer composition. The advantage of this method is that the magnetizable pigments are used more sparingly. In contrast to this there is the disadvantage of the complicated arrangement this disadvantage becoming increasingly less important in the case of mass-production. A stripe pattern 25b or 26b is obtained by this method, this pattern being able to be provided with the corresponding surface structure by the subsequent rollers 18.

As is known, photographic paper is produced in relatively large widths and subsequently cut into rolls or sheets. For the production of rolls it is of course purposeful to cut the rolls along the width of the material, so that stripes are obtained which run parallel to the edge. Diagonal stripes according to FIG. 4 can only be obtained for sheets by cutting the material diagonally to its lengthwise direction. The diagonal arrangement of the stripes can therefore only be purposefully used for special applications.

The light-sensitive or magnetizable layer or layers are well-known in the art. The present invention is in particular useful for colorphotographic print-paper. The light-sensitive element of the material contains in general three silver halide emulsion layers including a blue-sensitive layer forming the yellow partial image, a green-sensitive layer for the magenta partial image and a red-sensitive layer forming the cyan partial image. The layers are processed by colorforming development to form a colorphotographic image in true colors. The color couplers capable of reacting with the oxidation product of the colorforming developer to form the desired dye are added either to the lightsensitive layers or to the colorforming developer baths. Furthermore the layers contain the usual additives which are well-known in the art. The same holds true for the magnetizable layer which as already mentioned hereinbefore contains a magnetizable pigment dispersed in a suitable binding agent. Suitable magnetizable pigments are e.g. ferromagnetic iron oxides of different type containing if desired dopants to improve the magnetic properties of other ferromagnetic metal oxides such as chromium dioxide. Many binding agents are known as operative form magnetizable layers, reference is made e.g. to the following: Polyvinyl esters such as polyvinyl acetate, copolymers of vinyl acetate in particular with vinyl chloride, copolymers or homopolymers of other polymerizable monomers such as ethylen, propylen, acrylic acid and its derivatives, vinylidenchlorid etc. Other suitable binding agents are polyaddition products or polycondensation products such as those of the polyurethane type or mixtures of the above polymers.

We claim:

1. An improved recording material having a magnetizable recording surface comprising a film substrate, a light sensitive layer on one surface, and a magentizable material which contains a magnetic pigment on the other surface of the support consisting of a polymeric binder with incorporated magnetic pigments wherein the improvement comprises a plurality of strips of said magnetizable material having areas of differing surface roughness consisting of at least one stripe having a surface of lesser roughness and at least one stripe having a surface of greater roughness.

2. Recording material according to claim 1, characterized in that the stripes run parallel to the longer edge of the film substrate.

3. Recording material according to claim 1, characterised in that the stripes are alternatively elevated and lowered.

4. Recording material according to claim 1, characterised in that the polymeric layer consists of stripes of alternatively arranged magnetizable polymer composition and non-magnetizable polymer composition.

5. A process for the production of areas of differing surface roughness on a recording material having a light sensitive layer on one surface of a film substrate which moves relative to an assembly comprising a means for applying a heated polymer material pigmented with magnetic particles as a coating to the other surface of the substrate and impressing the coating into a layer on said other surface of the substrate with a calender roller, characterized by the steps of providing a plurality of ring zones of varying roughness on the calender roller, traversing the coating layer on the other surface with the zones whereby varying areas of roughness are produced in the surface of the magnetic material.

6. A process according to claim 5, characterised in that the magnetic pigments are needle-shaped iron oxide particles which are at least partially parallel oriented by application of a magnetic field during coating.

7. A process for the production of a recording material according to claim 5, characterised in that the magnetizable layer additionally contains titanium dioxide.

8. A process according to claim 7, characterised in that the magnetizable layer is provided with grooves and that the grooves are filled with white pigmented polyethylene.

9. A process for the production of a recording material according to claim 5, characterized in that in the support is coated alternatively with stripes of magnetizable polymer composition and non-magnetizable polymer composition fed from separate containers.

* * * * *